United States Patent
Bai et al.

(10) Patent No.: US 10,318,937 B2
(45) Date of Patent: Jun. 11, 2019

(54) GENERATING A PRODUCT MODEL

(71) Applicant: International Business Machines Corporation, Armonk, NY (US)

(72) Inventors: Lin Bai, Dalian (CN); Na Dong, Beijing (CN); Ling Gong, Beijing (CN); Ying Liu, Beijing (CN); Xi Ning Wang, Beijing (CN); Ming M. Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/945,491

(22) Filed: Nov. 19, 2015

(65) Prior Publication Data

US 2016/0154632 A1 Jun. 2, 2016

(30) Foreign Application Priority Data

Nov. 27, 2014 (CN) .......................... 2014 1 0697451

(51) Int. Cl.
*G06F 8/74* (2018.01)
*G06Q 20/10* (2012.01)
(Continued)

(52) U.S. Cl.
CPC .............. *G06Q 20/10* (2013.01); *G06F 8/74* (2013.01); *G06Q 10/067* (2013.01); *G06Q 20/405* (2013.01); *G06Q 30/0621* (2013.01)

(58) Field of Classification Search
CPC ........ G06F 8/74; G06Q 20/10; G06Q 10/067; G06Q 20/405; G06Q 30/0621
See application file for complete search history.

(56) References Cited

U.S. PATENT DOCUMENTS 6,847,981 B2   1/2005 Song et al.
7,249,344 B1 * 7/2007 Zeanah ................. G06Q 20/32
                                                            705/35
(Continued)

FOREIGN PATENT DOCUMENTS

WO   2008152515 A2   12/2008
WO   2014051864 A1    4/2014

OTHER PUBLICATIONS

IP.Com, Transforming to a Smarter Core Banking Systems Environment, IBM Redbook Form No. REDP-4934-00, Publication Date Oct. 3, 2012; 2 pages.
(Continued)

*Primary Examiner* — Wei Y Zhen
*Assistant Examiner* — Amir Soltanzadeh
(74) *Attorney, Agent, or Firm* — Cantor Colburn LLP; Anthony Curro (57) ABSTRACT

An aspect of generating a product model includes extracting from source code of an application system at least one transaction definition associated with the source code. Each transaction definition describes a transaction in a product implemented by the source code. An aspect also includes dividing the transaction definition into one or more product categories, and obtaining a product component associated with one of the product categories from the source code so as to generate the product model. The product component includes at least one product parameter associated with the product category, and the product model includes an association relationship between the product category and the at least one product parameter.

14 Claims, 8 Drawing Sheets

(51) Int. Cl.
    *G06Q 10/06*     (2012.01)
    *G06Q 30/06*     (2012.01)
    *G06Q 20/40*     (2012.01)

(56) References Cited

U.S. PATENT DOCUMENTS

| | | | |
|---|---|---|---|
| 8,069,435 B1 * | 11/2011 | Lai | G06Q 10/10 |
| | | | 717/106 |
| 8,326,963 B2 | 12/2012 | Moussallam et al. | |
| 2005/0138603 A1 | 6/2005 | Cha et al. | |
| 2005/0144033 A1 * | 6/2005 | Vreeke | G06Q 10/06 |
| | | | 705/7.28 |
| 2006/0059107 A1 * | 3/2006 | Elmore | G06Q 10/06 |
| | | | 705/64 |
| 2007/0245320 A1 | 10/2007 | Cotichini et al. | |
| 2008/0306986 A1 * | 12/2008 | Doyle, Sr. | G06Q 10/10 |

OTHER PUBLICATIONS

Saket Sinha, "The Changing Face of Core Banking Transformation" May 28, 2014; 5 pages.
Venkatraghavan N. Iyer, "Legacy Modernization", Infosys, Building Tomorrow's Enterprise, Apr. 2008, 9 pages.

* cited by examiner

GENERATING A PRODUCT MODEL

FOREIGN PRIORITY

This application claims priority to Chinese Patent Application No. 201410697451.5, filed 27 Nov. 2014, and all the benefits accruing therefrom under 35 U.S.C. § 119, the contents of which in its entirety are herein incorporated by reference.

BACKGROUND

The present disclosure relates generally to data processing and, more specifically, to generating a product model from a legacy application system.

With the development of computer technology, the development mode of application systems has gone through many changes. In an application system developed in earlier days, typically various data (e.g., product parameters) involved in the business flow are closely coupled to source code (e.g., embedded into source code). As a result, modification of the application system, once it has been completed, is difficult.

Using a banking application as an example, data used in a legacy banking system application is typically closely coupled to the source code. Banks can offer various products to the public, such as fixed-term deposit product, demand deposit product, etc. It is appreciated that one product may have a large amount of parameters, which are referred to herein as product parameters. For example, the fixed-term deposit product may comprise such product parameters as basic account information, date of deposit, time length of deposit, and amount of deposit; the demand deposit product may comprise product parameters such as basic account information, date of deposit, date of withdrawal, amount of deposit, etc. In legacy application systems, these product parameters are closely coupled to source code, and only after specialized technicians analyze the source code can it be learned which product parameters are involved in a product implemented by the source code.

In addition, the development of computer technology promotes the evolution of programming languages. Most of earlier programming languages (e.g., the COBOL language, the C language, etc.) adopt procedure-oriented programming patterns, whereas in recent years, all popular programming languages (e.g., C++, Java) are adopting object-oriented programming patterns. In trades such as power and finance, there are a large amount of legacy application systems that are developed in early programming languages, and these legacy application systems have become core systems in various trades.

Techniques of legacy application systems are gradually outdated and replaced by new techniques (e.g., object-oriented programming patterns) and new platforms (cloud environment). How to achieve modernization on an earlier application system where data is closely coupled to source code becomes a focus of attention.

SUMMARY

According to an embodiment, a method for generating a product model from an application system is provided. The method includes extracting, by a computer processor from source code of the application system, at least one transaction definition associated with the source code. Each transaction definition of the transaction definition describes a transaction in a product implemented by the source code. The method also includes dividing the transaction definition into one or more product categories, and obtaining a product component associated with one of the product categories from the source code so as to generate the product model. The product component includes at least one product parameter associated with the product category, and the product model includes an association relationship between the product category and the at least one product parameter. A corresponding apparatus and computer program product are also disclosed herein.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

During modernization of legacy applications, it is needed to learn relevant data of various products involved in the legacy application system and build a product model, so as to achieve modernization on the legacy application system based on the product model with reference to specific code of the legacy application system. This typically requires a technician with extensive programming experience to manually read the source code of the legacy application system so as to obtain product-related data. The process utilizes significant manpower, material resources and time overheads. Additionally, as programming languages develop rapidly, it may become more difficult to find technicians proficient in early programming languages (e.g., COBOL).

The embodiments described herein provide application system modernization with respect to generating product models from source code of a legacy application system while minimizing the manual operations otherwise needed.

Figure 1:
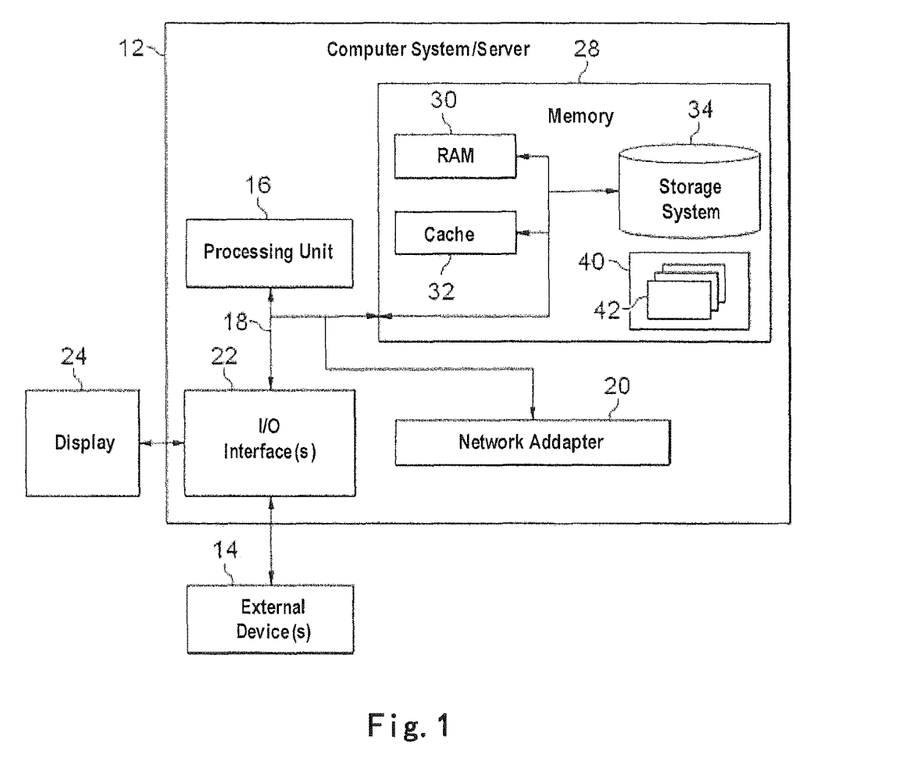
FIG. 1 schematically shows an exemplary computer system/server which is applicable to implement the embodiments of the present invention.

Referring now to FIG. 1, in which an exemplary computer system/server 12 which is applicable to implement the embodiments is shown. Computer system/server 12 is only illustrative and is not intended to suggest any limitation as to the scope of use or functionality of the embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, techniques for generating a business rule model will be illustrated with a specific example of a legacy application system. In trades such as finance, electric power and the like, most early application systems are developed using COBOL due to its stronger stability. In the context of the present disclosure, implementation of the techniques is illustrated with a banking application system developed using COBOL as a specific example. However, those skilled in the art should understand the embodiments are not limited to banking application systems or limited to application systems developed in COBOL; instead, it may be applied to application systems in trades which are developed using various languages.

It is appreciated that the techniques described herein may also be applied to other environments. For example, in industrial environment of temperature control, it may be a product that may control temperature at a given position on the production line, and product parameters of the product may be various parameters associated with control of the temperature at this position, such as humidity, air pressure, wind velocity, and so on.

Figure 2:
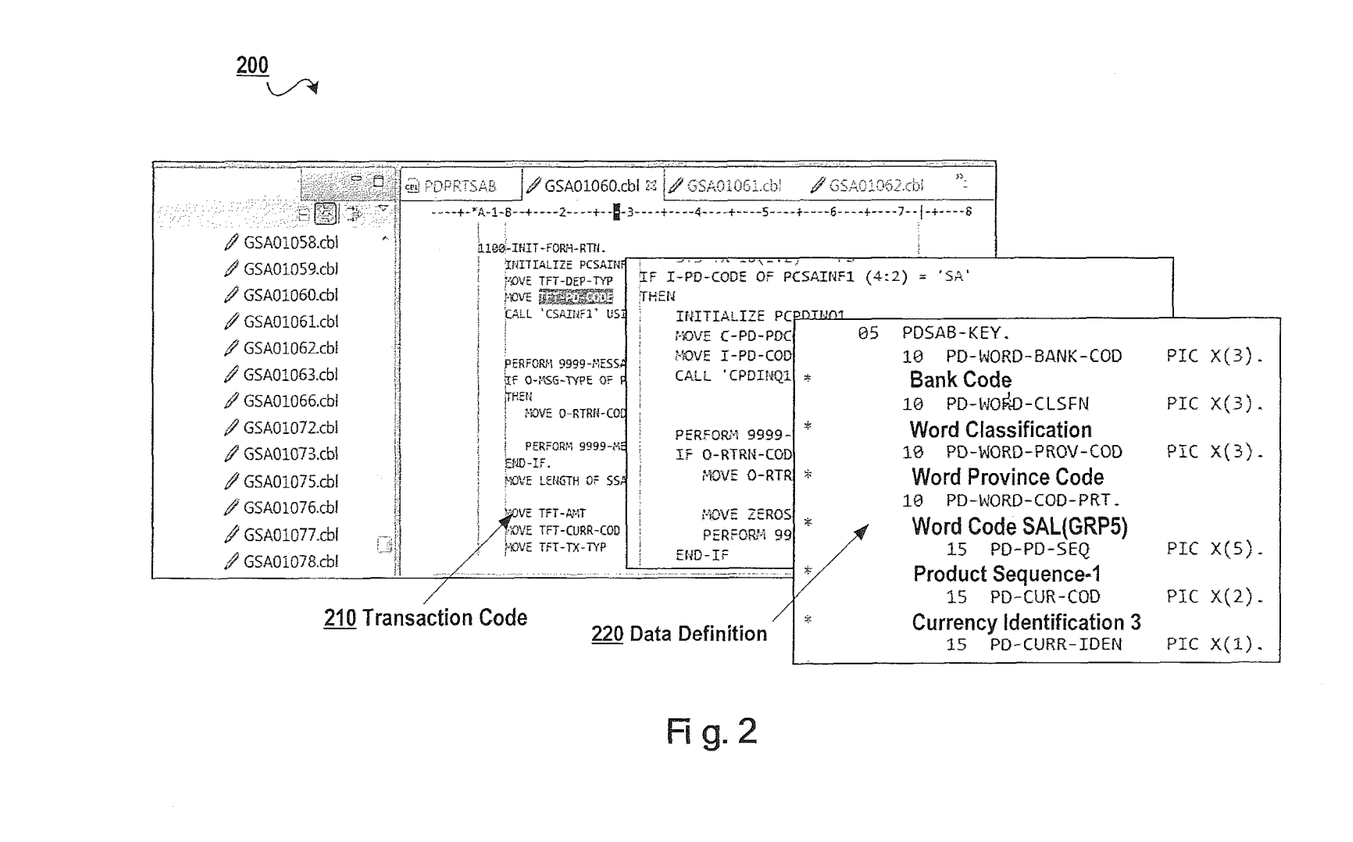
FIG. 2 shows a schematic view of source code of a legacy application system according to one embodiment.

FIG. 2 shows a schematic view 200 of source code of a legacy application system according to one embodiment. As shown in this figure, two types of source code may be involved in a development using COBOL, for example, data definition 220 is for defining code of the data structure used in source code; in the COBOL language, the data structure may be defined in a "COPYBOOK" file. When a user uses other programming languages, the data structure in use may be defined in other types of files (for example, a data structure may be defined in a ".h" file in the C language).

Transaction code 210 defines a specific implementation of code, which may include various logic processes in source code. For example, in code of a banking application system, transaction code is, for example, code used for implementing a given transaction in banking, such as code for implementing a loan transaction, code for implementing a transaction of opening a deposit account, or code for implementing a deposit-saving transaction, etc. Specifically, transaction code 210 may comprise a main logic process, and may further comprise a plurality of other logic processes that are called by the main logic process. In the COBOL language, transaction code 210 may be stored in a ".cbl" file, while in the C language, it may be present in a ".c" file.

Table 1 below schematically illustrates one example of data definition used in COBOL, in which example various data structures used by source code may be defined in a "COPYBOOK" file. For example, a data structure "PD-WORD-BANK-COD" defined in the example in Table 1 represents bank code, and there is also defined a data structure "PD-WORD-CLSFN" representing word classification, etc.

TABLE 1 example of a COPYBOOK File.

*@SEMANTIC(bank code)
   10 PD-WORD-BANK-COD      PIC X(3).
*@SEMANTIC(word classification)
     10 PD-WORD-CLSFN        PIC X(3).
...

It is appreciated that in the example shown in Table 1, "PD-WORD-BANK-COD" is a variable parameter defined in source code, while "bank code" is a product parameter represented by this variable parameter. In other words, the variable parameter represents a variable name defined in source code, while the product parameter represents logical meaning of the variable name that is defined in source code in the real world (e.g., the banking industry). Therefore, there may be a one-to-one correspondence between variable parameters and product parameters, and such a correspondence may be obtained by resolving the definition of data structure in COPYBOOK (e.g., by analyzing the annotations in source code).

Table 2 below schematically shows a code fragment of specific implementation of source code. The code fragment as shown in Table 2 below, includes a main logic process "0000-MAIN-PROCESS-RTN," and the main logic process calls a plurality of logic processes, i.e., "1000-SUB-LOGIC," "1001-SUB-LOGIC," . . . , "3000-SUB-LOGIC." Each logic process shown in Table 2 may call various data structures shown in Table 1.

TABLE 2 example of Source Code Fragment

0000-MAIN-PROCESS-RTN.
   PERFORM 1000-SUB-LOGIC.
   PERFORM 1001-SUB-LOGIC.
   PERFORM 1002-SUB-LOGIC.
   PERFORM 2000-SUB-LOGIC.
   PERFORM 2001-SUB-LOGIC.
   PERFORM 3000-SUB-LOGIC.
   GOBACK.
1000-SUB-LOGIC.
...
1001-SUB-LOGIC.
...
1002-SUB-LOGIC.
...
2000-SUB-LOGIC.
...
2001-SUB-LOGIC.
...
3000-SUB-LOGIC.
...

It is appreciated that there is no concept of "object" when using code that is developed in a process-oriented programming language like COBOL. Instead, various data associated with an object is scattered across various positions of entire source code (e.g., may be distributed across a plurality of source code files). Specifically, in the banking application environment, one product (e.g., fixed-term deposit product, etc.) may be considered as one object. In source code of an application system that is developed in COBOL, various product parameters (e.g., basic account information, date of deposit, time length of deposit, amount of deposit, etc.) associated with the fixed-term deposit product will be scattered across various positions in the source code.

Therefore, achieving modernization on an earlier application system where data is closely coupled to source code can be challenging.

The exemplary embodiments described herein provide techniques for generating a product model from an application system. A technique includes extracting from source code of the application system at least one transaction definition associated with the source code. Each transaction definition of the at least one transaction definition describes a transaction in a product implemented by the source code. The technique includes dividing the transaction definition into at least one product category, and obtaining a product component associated with a product category of the product category from the source code so as to generate the product model. The product component describes at least one product parameter associated with the product category, and the product model describes an association relationship between the product category and the product parameter.

Figure 3:
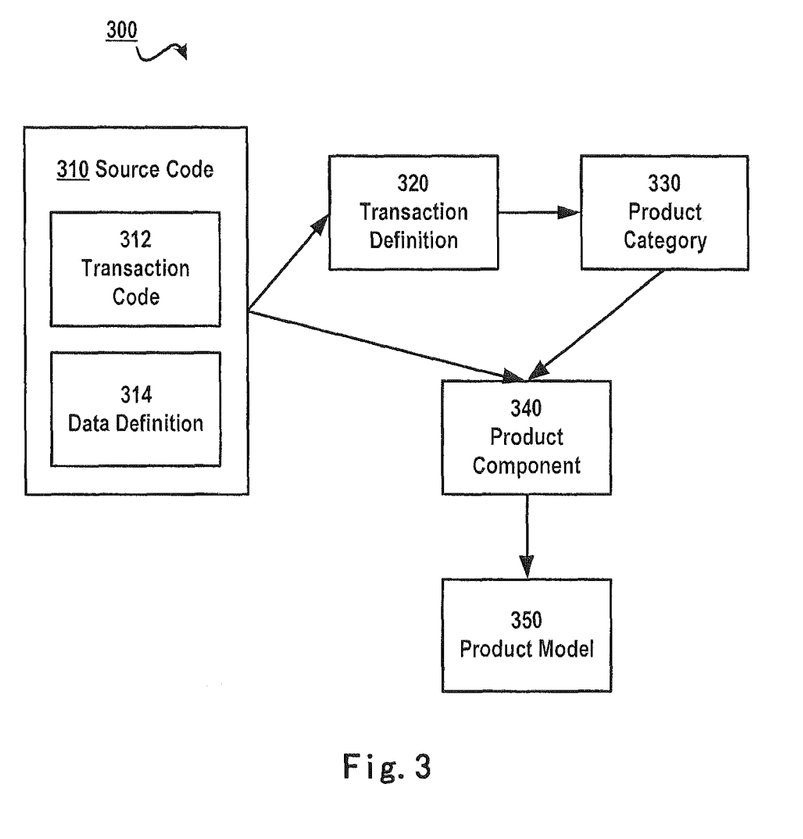
FIG. 3 schematically shows a block diagram of a components for generating a product model according to one embodiment of the present invention.

FIG. 3 schematically shows a block diagram 300 of components for generating a product model according to one embodiment. As shown in FIG. 3, source code 310 may comprise transaction code 312 and a data definition 314. In this embodiment, at least one transaction definition 320 may be obtained from source code 310, and subsequently the transaction definition is divided into at least one product category 330. In addition, a product component 340 of a product implemented by source code 310 may be obtained from source code 310. Further, a product model 350 is obtained on the basis of product component 340 and product category 330. In this embodiment, the product component describes at least one product parameter associated with the product category, and the product model describes an association relationship between the product category and the product parameter.

Figure 4:
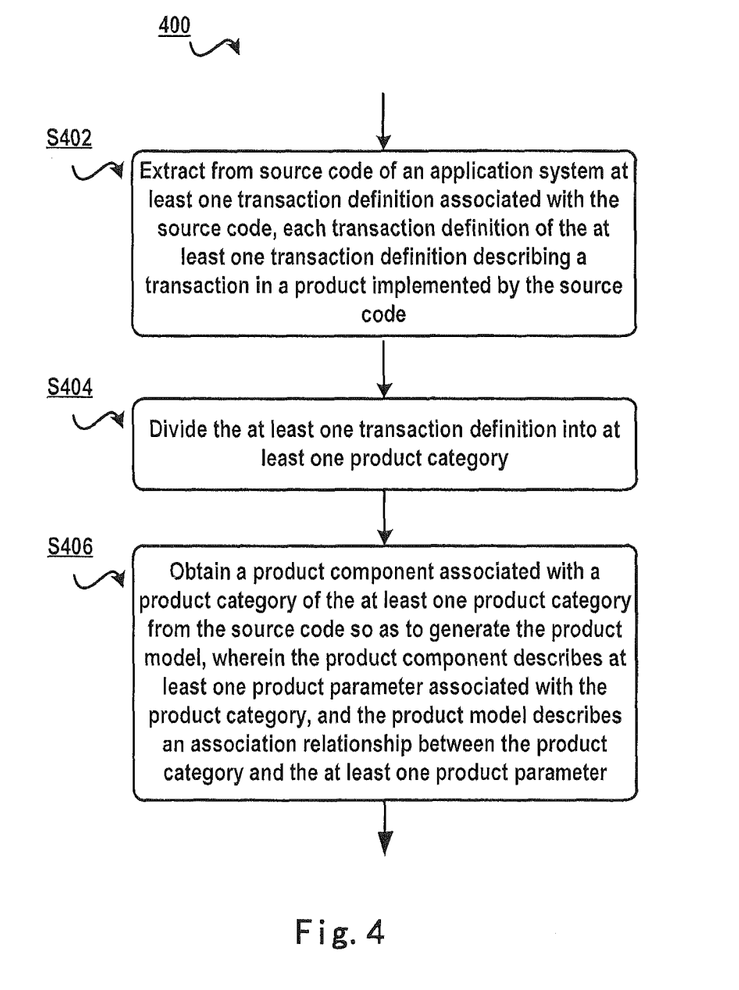
FIG. 4 schematically shows a flowchart of a method for generating a product model according to one embodiment of the present invention.

With reference to FIG. 4, this figure schematically shows a flowchart 400 of a method for generating a product model according to one embodiment. In step S402, at least one transaction definition associated with source code of an application system is extracted from the source code. Each transaction definition of the transaction definition describes a transaction of a product implemented by the source code. In this step, various transaction definitions may be obtained by analyzing the source code. Throughout the context of the present disclosure, it is not intended to limit scope of the source code. Instead, in the context of the present disclosure, the source code may be either source code fulfilling all functions of an application system or source code fulfilling a part of functions of the application system.

In the banking application compiled in COBOL, source code associated with a deposit transaction may be analyzed to further obtain a product model of a deposit related product; or source code associated with a loan transaction may be analyzed to further obtain a product model of a loan related product. It is appreciated that in the context of the present disclosure the product model may take a tree structure. Different subtrees of the product model may be obtained by analyzing source code implementing different products, and further a complete product model may be achieved gradually.

In step S404, the transaction definition is divided into at least one product category. Those skilled in the art should note one product may involve multiple respects. For example, a deposit product might involve a transaction of opening an account, a deposit-saving transaction, a transaction of closing an account, etc. Therefore, these transactions need to be categorized so that various transactions associated with the same product may be divided into the same product category.

In this step, for example, a plurality of transaction definitions (e.g., account opening, deposit saving, account closing) have been obtained by analyzing source code, and it is found all these transactions are operations on deposit accounts. Then, the plurality of transaction definitions may be divided into one product category, i.e., deposit products.

In step S406, a product component associated with a product category of the product category is obtained from the source code so as to generate the product model, whereby the product component describes at least one product parameter associated with the product category, and the product model describes an association relationship between the product category and the product parameter.

It is appreciated that, it has been described above with reference to Table 1 that source code may comprise a variable parameter corresponding to at least one product parameter of a product implemented by the source code, so a product component may be obtained from the source code to further generate a product model describing an association relationship between the product category and the at least one product parameter.

In one embodiment, obtaining a product component associated with a product category of the product category from the source code so as to generate the product model may include, with respect to a current product category of the at least one product category, obtaining from the source code a product component associated with the current product category; and generating the product model based on the current product category and the product component.

In this embodiment, processing may be performed with respect to each product category of the product category obtained in step S404 in FIG. 4 above. Specifically, if to-be-analyzed source code is source code relating to a deposit product only, then in this embodiment processing may be performed with respect to only such the product category of the deposit product. However, when using the method of the present disclosure, usually it is not possible to accurately separate source code that is associated with a specific product category, so at this point a plurality of product categories are obtained in step S404. In this embodiment, therefore, processing needs to be performed with respect to each product category among the plurality of product categories.

Optionally, those skilled in the art may further set granularity of product categories. For example, the deposit product may further be divided into a fixed-term deposit product and a demand deposit product. In this manner, the precision of the product model may further be increased so as to, during modernization on the legacy application system developed in COBOL, enable those skilled in the art to further understand product parameters of each product and further facilitate the migration to object-oriented development languages.

Specifically, when the deposit product is further divided into a fixed-term deposit product and a demand deposit product, the common part between product parameters of the fixed-term deposit product and the demand deposit product may be used as basic product parameters of the deposit product (for example, may be represented as a base class in object-oriented languages), and other parameters than the common part between product parameters of the fixed-term deposit product and the demand deposit product may be used as additional product parameters (for example, may be represented as a derived class in object-oriented languages). Thereby, it better helps the migration to object-oriented development languages.

In one embodiment, obtaining a product component associated with the current product category includes selecting from transaction code in the source code at least one variable parameter associated with a transaction definition in the current product category; and building the product component from the variable parameter by analyzing a data definition in the source code.

Those skilled in the art should note there might exist many variable parameters in transaction code of the source code, while only a part of these variable parameters are associated with a transaction definition in the current product category. In addition, other variable parameters might further exist in the transaction code, for example, intermediate variables involved in programming, or variables defined for purposes like mathematical computation, etc. Although these variable parameters are also referenced by the transaction code, they are not product parameters for describing the product under current discussion.

Therefore, in this embodiment after selecting at least one variable parameter associated with a transaction definition in the current product category, the product component needs to be built from the variable parameter by analyzing a data definition in the source code. Since a one-to-one correspondence between variable parameters and product parameters may be determined from the data definition in the source code, the product component describing the product parameter associated with the product category may be built in this embodiment.

In this embodiment, the selecting from transaction code in the source code at least one variable parameter associated with a transaction definition in the current product category comprises: in response to there existing a call of the at least one variable parameter in the transaction code in the source code, selecting the at least one variable parameter. In this embodiment, the at least one variable parameter may be selected based on the call of the variable parameter in the source code.

In one embodiment, the building the product component from the variable parameter by analyzing a data definition in the source code includes determining a product parameter represented by each variable parameter of the variable parameter based on a definition of the variable parameter in the data definition, and constructing the product component based on the product parameter.

Specifically, suppose three variable parameters A, B and C are called in the source code implementing the deposit product. At this point, it is found through analyzing the data definition in the source code that the variable parameter A is a product parameter "date of deposit" (for example, Jan. 1, 2014) involved in the deposit product, the variable parameter B is a product parameter "amount of deposit" (for example, 1000 Yuan) involved in the deposit product, and the variable parameter C is not a product parameter involved among deposit product but an intermediate variable for mathematical computation. Thus, it may be considered only the variable parameters A and B are product parameters involved in the deposit product. By analyzing the data definition in the source code, the irrelevant variable parameter may be deleted from the three variable parameters A, B and C, and the product component is built based on the variable parameters A and B.

Figure 5:
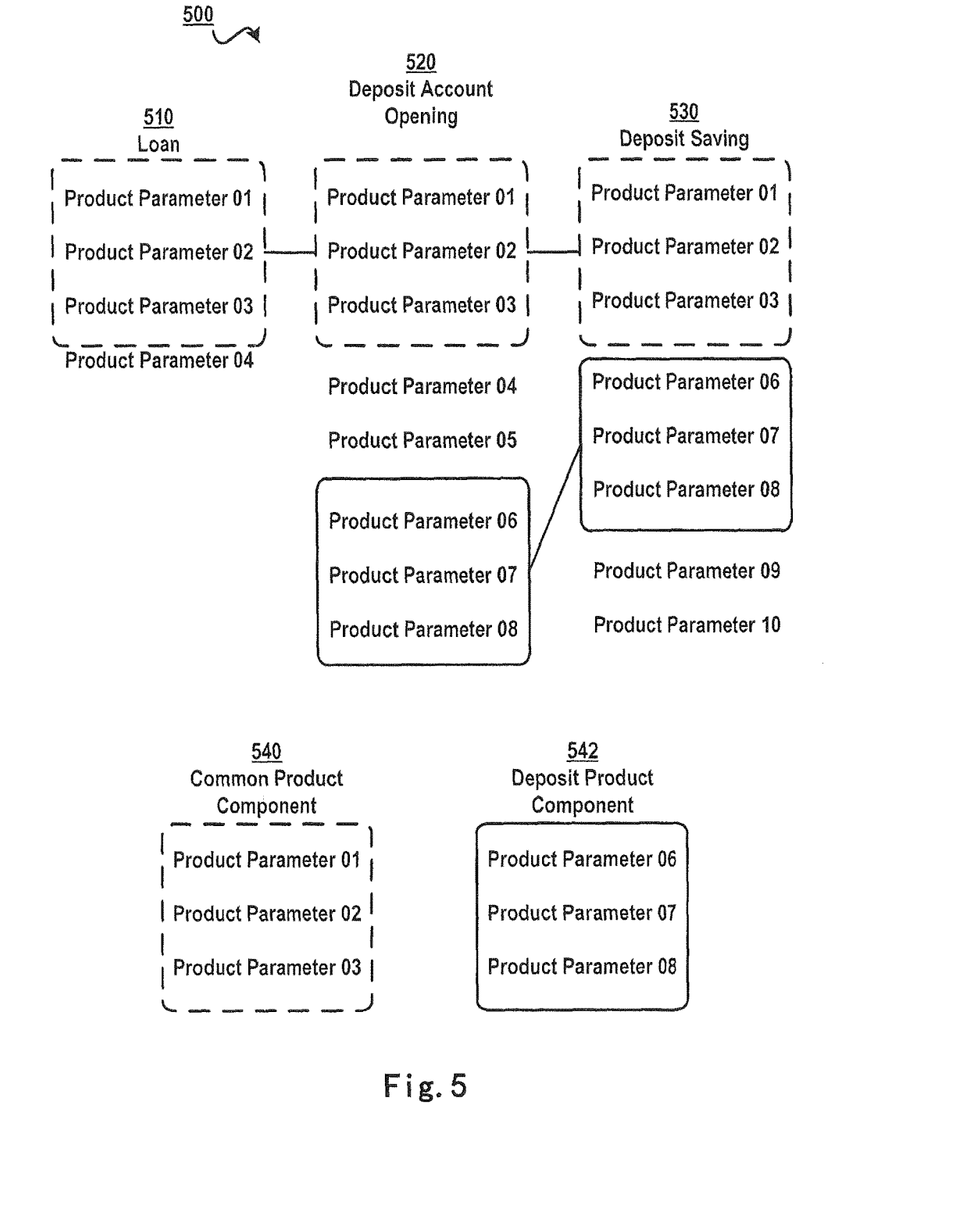
FIG. 5 schematically shows a block diagram of a process for obtaining a product component according to one embodiment of the present invention.

FIG. 5 schematically shows a block diagram 500 of the process for constructing a product component according to one embodiment. As shown in FIG. 5, there are shown three transaction definitions extracted from the source code, i.e., loan 510, deposit account opening 520 and deposit saving 530. In particular, at least one product parameter associated with each transaction definition may be obtained using the above method. For example, product parameters associated with loan 510 comprise product parameters 01-04, product parameters associated with deposit account opening 520 comprise product parameters 01-08, and product parameters associated with deposit saving 530 comprise product parameters 01-03 and 06-10.

In this example, the product component may be constructed after obtaining product parameters associated with each transaction definition. Specifically, the product component may be constructed by clustering various product parameters. For example, as seen from the example in FIG. 5, each transaction definition involves product parameters 01-03, so product parameters 01-03 may be clustered to a common product component 540. Common product component 540 represents each transaction definition needs to call product parameters in common product component 540.

For another example, it may further be found from the example in FIG. 5 both deposit account opening 520 and deposit saving 530 involve product parameters 06-08, and both deposit account opening 520 and deposit saving 530 belong to such a product category as deposit product. Thus, at this point product parameters 06-08 may be clustered to a deposit product component 542. Deposit product component 542 represents various transaction definitions associated with the deposit product need to call product parameters in deposit product component 542.

It is appreciated that, FIG. 5 schematically shows only three transaction definitions to illustrate how to construct product components through a simple example. In a real application environment, there might be dozens of transaction definitions or even more, and each transaction definition might involve dozens and even hundreds of product parameters. Those skilled in the art may obtain other product component according to the above principle, which is not detailed here.

Figure 6:
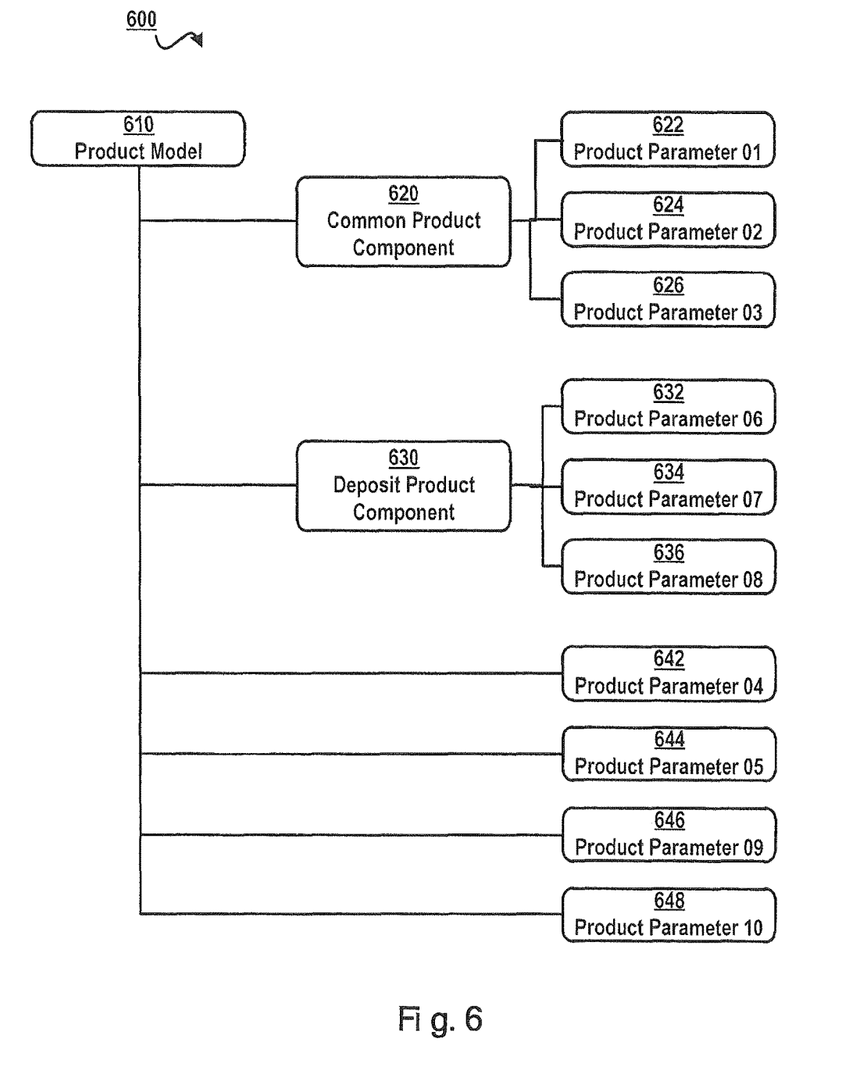
FIG. 6 schematically shows a block diagram of a generated product model according to one embodiment of the present invention.

FIG. 6 schematically shows a block diagram 600 of a product model generated according to one embodiment. As shown in this figure, a product model 610 may include a common product component 620 and a deposit product component 620, as well as product parameters 04, 05, 09 and 10 denoted by reference numerals 642-648 respectively. Further, common product component 620 may include product parameters 01-03 denoted by reference numerals 622-626 respectively, and deposit product component 630 may include product parameters 06-08 denoted by reference numerals 632-636.

It is appreciated that although FIG. 6 only depicts a product model having three levels, when a product implemented by source code is more complex, the product model may further have more levels. For example, common product component 620 may further comprise basic account information component (including, for example, account ID, account opening time, account opening place, etc.) and an account holder basic information component (including, for example, account holder name, account holder contact information, etc.). At this point, common product component 620 may include two levels, so the product model includes four levels at this point.

In one embodiment of the, the extracting from source code of an application system at least one transaction definition associated with the source code includes extracting the at least one transaction definition based on a logic process defined in the transaction code in the source code.

Specifically, when extracting at least one transaction definition associated with the source code, an execution statement may be looked up in the transaction code in the source code and a keyword describing a logic process is obtained, and further a code paragraph is located based on the keyword and the related transaction definition is extracted. Regarding source code written in COBOL (for example, the source code fragment shown in Table 2 above), a "PERFORM" statement may be looked up in the source code and a paragraph keyword (for example, "1000-SUB-LOGIC") obtained, and subsequently a corresponding code paragraph may be found based on "1000-SUB-LOGIC" for analysis later.

In addition, those skilled in the art should further note although not shown in Table 2, there might further exist a nested call in the source code. For example, other logic processes "1001-SUB-LOGIC" (for example, associated with deposit account opening) and "1002-SUB-LOGIC" (for example, associated with deposit saving) may further be called by statements "PERFORM 1001-SUB-LOGIC" and "PERFORM 1002-SUB-LOGIC" respectively in the logic process "1000-SUB-LOGIC." At this point, "PERFORM" statements may be looked up using a similar approach, and further keywords "1001-SUB-LOGIC" and "1002-SUB-LOGIC" may be obtained.

In one embodiment, the dividing the transaction definition into at least one product category includes dividing the transaction definition into the product category based on a call of the logic process in the transaction code of the source code.

Continuing the above example, suppose the logic process "1000-SUB-LOGIC" is source code implementing the "deposit product," and the "deposit product" may further involve "account opening" and "deposit saving." Since other logic processes "1001-SUB-LOGIC" and "1002-SUB-LOGIC" may further be called by statements "PERFORM 1001-SUB-LOGIC" and "PERFORM 1002-SUB-LOGIC" respectively in the logic process "1000-SUB-LOGIC," at this point transactions for implementing "account opening" and "deposit saving" may be dispatched to the "deposit product" based on the above call. In this manner, the transaction definition may be divided into at least one product category based on the call of the logic process in the transaction code of the source code.

In one embodiment, there is provided a method for generating a new product based on a product model, including receiving a product model generated according to the techniques described herein, and generating the new product by combining at least one product parameter in the product model.

Figure 7:
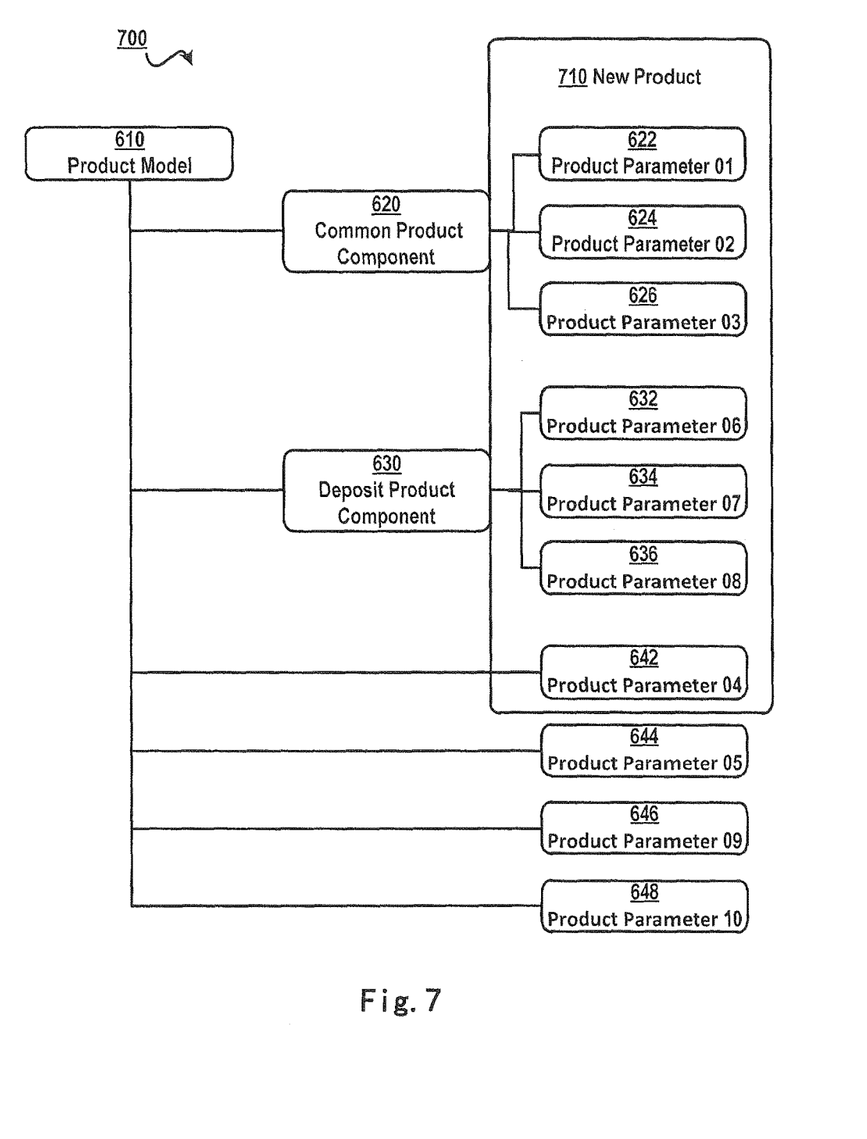
FIG. 7 shows a schematic view of generating a new product based on a product model according to one embodiment of the present invention.

FIG. 7 depicts a schematic view 700 of generating a new product based on a product model according to one embodiment. Where the product model as shown in FIG. 6 is obtained, at least one product parameter in the product model is combined to generate the new product. As shown in FIG. 7, as seen from the above steps of generating the product model, common product model 620 and deposit product model 630 are combined, whereby all product parameters associated with the deposit product are obtained.

When the bank desires to have a new dollar deposit product, according to existing technical solutions, developers have to redefine various product parameters associated with the dollar deposit product and rewrite related source code. This process is both time-consuming and complex. By means of the embodiments described herein, however, suppose the product parameter 04 denoted by a reference numeral 642 is a product parameter describing a currency of dollar, at this point only common product component 620, deposit product component 630 and product parameter 04 (as shown in a dashed block in FIG. 7) are combined, whereby all product parameters of a new product 710 (i.e., the dollar deposit product) are obtained. Thereby, the workload of technical persons can be reduced greatly.

In addition, where a product model has been built, data structures of various products developed in object-oriented languages may be set based on a hierarchical structure of the product model, and further the modernization of an application system that is developed in early days and where data and source code are closely coupled may be accelerated based on approaches like base class and derived class.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 8A:
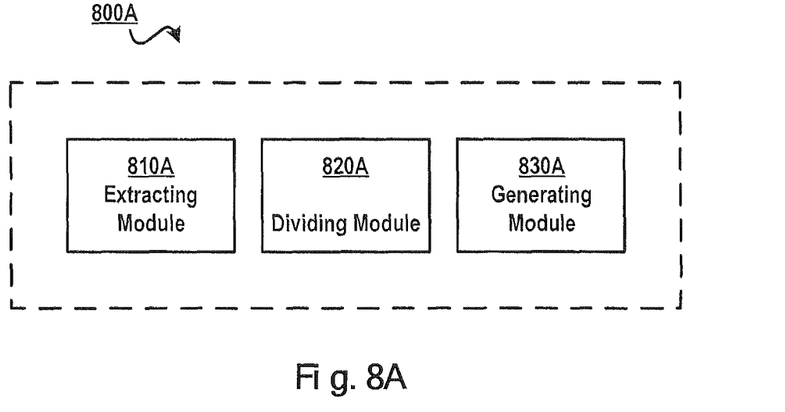
FIG. 8A schematically shows a block diagram of an apparatus for generating a product model from an application system according to one embodiment of the present invention.

FIG. 8A schematically shows a block diagram 800A of an apparatus for generating a product model from an application system according to one embodiment of the present invention. Specifically, there is provided an apparatus for generating a product model from an application system, comprising: an extracting module 810A configured to extract from source code of an application system at least one transaction definition associated with the source code, each transaction definition of the at least one transaction definition describing a transaction in a product implemented by the source code; a dividing module 820A configured to divide the at least one transaction definition into at least one product category; a generating module 830A configured to obtain a product component associated with a product category of the at least one product category from the source code so as to generate the product model, wherein the product component describes at least one product parameter associated with the product category, and the product model describes an association relationship between the product category and the at least one product parameter.

In one embodiment of the present invention, generating module 830A comprises: an obtaining module configured to, with respect to a current product category of the at least one product category, obtain from the source code a product component associated with the current product category; and a first generating module configured to generate the product model based on the current product category and the product component.

In one embodiment of the present invention, the obtaining module comprises: a selecting module configured to select from transaction code in the source code at least one variable parameter associated with a transaction definition in the current product category; and a building module configured to build the product component from the at least one variable parameter by analyzing a data definition in the source code.

In one embodiment of the present invention, the selecting module comprises: a first selecting module configured to, in response to there existing a call of the at least one variable parameter in the transaction code in the source code, select the at least one variable parameter.

In one embodiment of the present invention, the building module comprises: a determining module configured to determine a product parameter represented by each variable parameter of the at least one variable parameter based on a definition of the at least one variable parameter in the data definition; and a constructing module configured to construct the product component based on the product parameter.

In one embodiment of the present invention, extracting module 810A comprises: a first extracting module configured to extract the at least one transaction definition based on a logic process defined in the transaction code in the source code.

In one embodiment of the present invention, dividing module 820A comprises: a first dividing module configured to divide the at least one transaction definition into the at least one product category based on a call of the logic process in the transaction code of the source code.

Figure 8B:
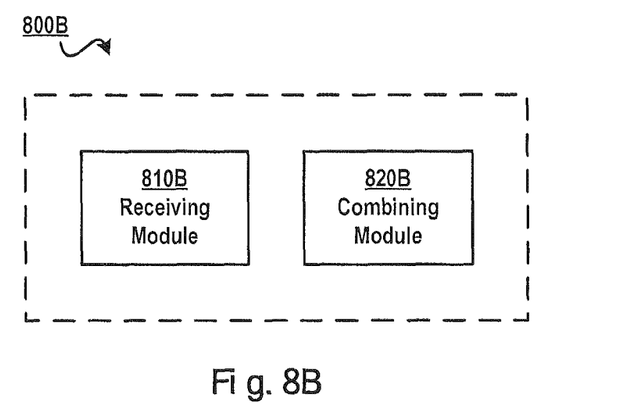
FIG. 8B schematically shows a block diagram of an apparatus for generating a new product based on a product model according to one embodiment of the present invention.

FIG. 8B schematically shows a block diagram 800B of an apparatus for generating a new product based on a product model according to one embodiment of the present invention. Specifically, there is provided an apparatus for generating a new product based on a product model, comprising: a receiving module 810B configured to receive a product model generated according to an apparatus of the present invention; and a combining module 820B configured to generate the new product by combining at least one product parameter in the product model.

By means of the methods and apparatuses of the present invention, a product model can be automatically generated from source code of an application system while manual intervention is reduced as far as possible. Further, a new product can be constructed using the generated product. And still further, it is possible to help a legacy application system to be migrated to new application environment based on the generated product model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a product model from an application system, comprising:
   extracting, by a computer processor from source code of a first application system developed using a procedure-oriented programming language, at least one transaction definition associated with the source code, each transaction definition of the at least one transaction definition describing a transaction in a product implemented by the source code of the first application system;

dividing, by the computer processor, the at least one transaction definition into at least one product category;
selecting from transaction code in the source code of the first application system at least one variable parameter associated with a transaction definition in the current product category based on a call of the variable parameter in the source code of the first application system;
building the product component from the at least one variable parameter by analyzing a data definition in the source code of the first application system;
generating the product model based on the current product category and the product component; and
migrating, by the computer processor, the first application system to a second application system using the product model, wherein the second application system is developed using an object-oriented programming language;
wherein the product component comprises at least one product parameter associated with the product category, and the product model includes an association relationship between the product category and the at least one product parameter,
wherein the product component is generated at least in part by clustering a plurality of product parameters according to a common product component and a deposit product component; and
wherein deposit product component represents various transaction definitions associated with a deposit product.

2. The method according to claim 1, wherein the extracting from source code of an application system at least one transaction definition associated with the source code comprises:
extracting the at least one transaction definition based on a logic process defined in the transaction code in the source code.

3. The method according to claim 2, wherein the dividing the at least one transaction definition into at least one product category comprises:
dividing the at least one transaction definition into the at least one product category based on a call of the logic process in the transaction code of the source code.

4. An apparatus for generating a product model from an application system, comprising:
a memory having computer readable instructions; and
a processor for executing the computer readable instructions, the computer readable instructions including:
extracting from source code of a first application system developed using a procedure-oriented programming language at least one transaction definition associated with the source code, each transaction definition of the at least one transaction definition describing a transaction in a product implemented by the source code of the first application system;
dividing the at least one transaction definition into at least one product category; and
with respect to a current product category of the at least one product category, selecting from transaction code in the source code of the first application system at least one variable parameter associated with a transaction definition in the current product category based on a call of the variable parameter in the source code of the first application system;
building the product component from the at least one variable parameter by analyzing a data definition in the source code of the first application system;
generating the product model based on the current product category and the product component; and
migrating the first application system to a second application system using the product model, wherein the second application system is developed using an object-oriented programming language;
wherein the product component comprises at least one product parameter associated with the product category, and the product model includes an association relationship between the product category and the at least one product parameter,
wherein the product component is generated at least in part by clustering a plurality of product parameters according to a common product component and a deposit product component, and
wherein deposit product component represents various transaction definitions associated with a deposit product.

5. The apparatus according to claim 4, wherein the selecting from transaction code in the source code at least one variable parameter associated with a transaction definition in the current product category comprises:
in response to there existing a call of the at least one variable parameter in the transaction code in the source code, selecting the at least one variable parameter.

6. The apparatus according to claim 4, wherein the building the product component from the at least one variable parameter by analyzing the data definition in the source code comprises:
determining a product parameter represented by each variable parameter of the at least one variable parameter based on a definition of the at least one variable parameter in the data definition; and
constructing the product component based on the product parameter.

7. The apparatus according to claim 4, wherein the extracting from source code of an application system at least one transaction definition associated with the source code comprises:
extracting the at least one transaction definition based on a logic process defined in the transaction code in the source code.

8. A computer program product comprising a computer readable storage medium having program instructions embodied therewith, wherein the computer readable storage medium is not a transitory signal per se, the program instructions executable by a computer processor to cause the computer processor to perform a method comprising:
extracting from source code of a first application system developed using a procedure-oriented programming language, at least one transaction definition associated with the source code, each transaction definition of the at least one transaction definition describing a transaction in a product implemented by the source code of the first application system;
dividing the at least one transaction definition into at least one product category; and
with respect to a current product category of the at least one product category, selecting from transaction code in the source code of the first application system at least one variable parameter associated with a transaction definition in the current product category based on a call of the variable parameter in the source code of the first application system;

building the product component from the at least one variable parameter by analyzing a data definition in the source code of the first application system;

generating the product model based on the current product category and the product component;

migrating a legacy, the first application system to a modern second application system using the product model, wherein the second application system is developed using an object-oriented programming language;

wherein the product component includes at least one product parameter associated with the product category, and the product model includes an association relationship between the product category and the at least one product parameter, wherein the product component is generated at least in part by clustering a plurality of product parameters according to a common product component and a deposit product component, and wherein deposit product component represents various transaction definitions associated with a deposit product.

9. The computer program product according to claim 8, wherein the selecting from transaction code in the source code at least one variable parameter associated with a transaction definition in the current product category comprises:

in response to there existing a call of the at least one variable parameter in the transaction code in the source code, selecting the at least one variable parameter.

10. The computer program product according to claim 8, wherein the building the product component from the at least one variable parameter by analyzing the data definition in the source code comprises:

determining a product parameter represented by each variable parameter of the at least one variable parameter based on a definition of the at least one variable parameter in the data definition; and constructing the product component based on the product parameter.

11. The computer program product according to claim 8, wherein the extracting from source code of the first application system developed using a procedure-oriented programming language at least one transaction definition associated with the source code comprises:

extracting the at least one transaction definition based on a logic process defined in the transaction code in the source code;

extracting, by a computer processor from source code of a first application system developed using a procedure-oriented programming language, at least one transaction definition associated with the source code, each transaction definition of the at least one transaction definition describing a transaction in a product implemented by the source code of the first application system;

dividing the at least one transaction definition into at least one product category; and with respect to a current product category of the at least one product category, selecting from transaction code in the source code of the first application system at least one variable parameter associated with a transaction definition in the current product category based on a call of the variable parameter in the source code of the first application system;

building the product component from the at least one variable parameter by analyzing a data definition in the source code of the first application system;

generating the product model based on the current product category and the product component;

wherein the product component includes at least one product parameter associated with the product category, and the product model includes an association relationship between the product category and the at least one product parameter.

12. The method according to claim 1, wherein the first application system is developed in COBOL.

13. The method according to claim 12, wherein an object of the object-oriented programming language of the second application system is used to centralize data scattered across various positions in COBOL source code.

14. The method according to claim 12, wherein an object of the object-oriented programming language represents the deposit product.

* * * * *